United States Patent Office 2,783,124
Patented Feb. 26, 1957

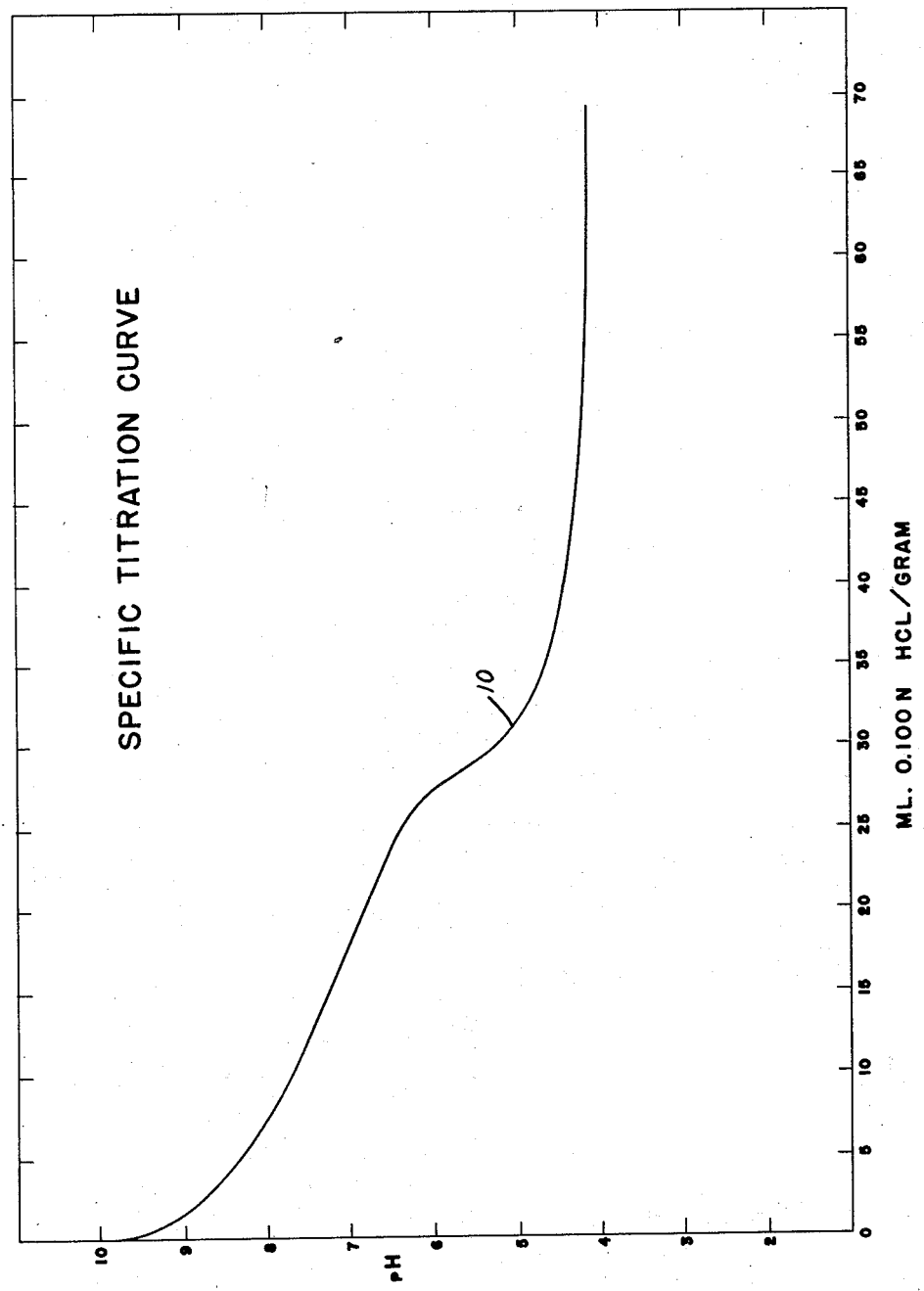

2,783,124

METHOD OF MAKING DIHYDROXY ALUMINUM CARBONATE COMPOUNDS

Irvine W. Grote, Chattanooga, Tenn., assignor to The Chattanooga Medicine Company, Chattanooga, Tenn., a corporation of Tennessee Application October 21, 1955, Serial No. 542,023

11 Claims. (Cl. 23—14)

This invention relates to a method of preparing dihydroxy aluminum carbonate compounds, and more particularly to a method of making dihydroxy aluminum sodium, potassium, or ammonium carbonates. These are true compounds having the generic structural formula hereinafter given. The compounds so obtained may be used in forming lakes in dyeing processes. In particular, however, the dihydroxy aluminum sodium carbonate is useful as an antacid, as more particularly described and claimed in my copending application filed of even date herewith. Serial No. 541,938, filed October 21, 1955.

It has heretofore been proposed, as in the Lowig German Patent No. 19,784 of 1882, to prepare a carbonated sodium aluminate or carbonated potassium aluminate by the reaction between sodium aluminate and sodium bicarbonate or the corresponding potassium salts. According to that patent, the reaction that takes place under the conditions specified therein is exemplified by the following equation:

$$K_2O.Al_2O_3 + 2NaHCO_3 \rightarrow K_2O.Al_2O_3.2CO_2 + 2NaOH$$

The German patent explains that the caustic alkali in an atmosphere charged with carbonic acid immediately is reconverted to bicarbonate and consequently is merely the carrier of the carbonic acid to the alkali aluminate.

The method of the present invention differs from that of the German patent in starting with an aluminum compound in which the aluminum is cationic and in yielding a final product that differs in structure from Lowig's product in respect to the location of the sodium atom. Furthermore, the aluminum compound used as my starting material is preferably a relatively water insoluble compound capable upon hydrolysis in a basic medium of furnishing aluminum groups containing at least 2 hydroxyl radicals, or of furnishing aluminum hydroxide, $Al(OH)_3$. Aluminum alkoxides, or alcoholates, and aluminum hydroxide gels are examples of preferred starting materials meeting these requirements. The other reactant is an alkali metal or ammonium bicarbonate. The reaction is carried out in an aqueous medium under basic conditions such that cationic aluminum groups associated with two or more hydroxyl radicals are available for reaction with the alkali metal or ammonium bicarbonate to give the desired end product, namely, a dihydroxy aluminum alkali metal carbonate, or dihydroxy aluminum ammonium carbonate.

It is therefore an important object of this invention to provide a new method for the preparation of these dihydroxy aluminum alkali metal or ammonium carbonate compounds by reacting an aluminum compound of the type referred to with the corresponding bicarbonate compound, in the presence of water.

Other and further important objects of this invention will become apparent from the following description and appended claims. The drawing is a chart of the specific titration curve for dihydroxy aluminum sodium carbonate.

The aluminum compounds used in the method of my present invention are preferably the aluminum alkoxides, such as aluminum isopropylate (tri-isopropoxide), but other aluminum tri-alkoxides may be used in which the alkoxide groups are $C_2$–$C_4$ groups. These aluminum alcoholates are hydrolyzable in an alkaline aqueous medium to form aluminum hydroxide or other aluminum group containing at least two hydroxyl radicals, the other valency of the aluminum being satisfied by, possibly, an alkoxide radical.

The reaction involved in the case of the aluminum alcoholates is represented by the following equation:

(1) 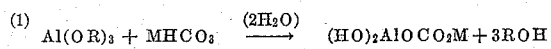
$$Al(OR)_3 + MHCO_3 \xrightarrow{(2H_2O)} (HO)_2AlOCO_2M + 3ROH$$

wherein R is a $C_2$–$C_4$ alkyl group and M is a monovalent radical of the class consisting of alkali metal and ammonium radicals. It is probable, as before stated, that the reaction involves an intermediate formation of dihydroxy aluminum alcoholate. This reaction is preferably carried out in the presence of equi-molar proportions of the reactants, although the bicarbonate may be in slight excess. The disadvantage of using any appreciable excess of bicarbonate is that it tends to be absorbed or occluded in the precipitate of the dihydroxy aluminum carbonate compound and must then be washed out in order to obtain the pure compound. Actually, only the one reaction product, namely, the dihydroxy aluminum alkali metal or ammonium carbonate, is formed, regardless of the excess of the bicarbonate used, thus confirming the fact previously stated that this reaction leads to a single true compound. The bicarbonate compound, being on the alkaline side itself, if present in at least equimolar proportions, maintains a pH of at least 7, a condition that is favorable to the formation of the desired end product.

Another suitable source of the cationic aluminum group is aluminum hydroxide, itself, which is available in the form of a gel, dried or semi-dried, or compressed, or in other water-reactive form. Any form of aluminum hydroxide can be used that is capable of providing the di- or tri-hydroxy aluminum group in a reactive state when dispersed in an aqueous medium at a pH of at least 7. The reaction between aluminum hydroxide and sodium bicarbonate is shown by the following equation:

(2) $Al(OH)_3 + NaHCO_3 \rightarrow (HO)_2AlOCO_2Na + H_2O$

The potassium and ammonium carbonates react in the same manner as shown for sodium carbonate in the above equation. Instead of starting with aluminum hydroxide, it is possible, although not so satisfactory, to start with an aluminum acylate, such as aluminum acetate, basic aluminum acetate, aluminum aceto-tartrate, and the like, or an inorganic aluminum salt, such as aluminum borate, bromate, bromide, chloride, and the like, and use such an excess of the bicarbonate as not only to neutralize the acidic component of the aluminum compound selected as the starting material but also to effect the formation of the intermediate di- or tri-hydroxy aluminum group for further reaction with the bicarbonate to form the dihydroxy aluminum alkali metal or ammonium carbonate. The principal objection to starting with the aluminum acylates or inorganic aluminum salts is that a pure dihydroxy aluminum alkali metal or ammonium carbonate compound is more difficult to obtain. Furthermore, unless the conditions are such as to bring about the intermediate formation of the di- or tri-hydroxy aluminum group previously referred to, other water insoluble products than the desired dihydroxy aluminum alkali metal or ammonium carbonate are likely to be formed. It is therefore much simpler and greatly to be preferred to start with an aluminum alcoholate or aluminum hydroxide as the source of the cationic aluminum group.

The aluminum compound and the bicarbonate that are selected may be admixed dry and added to the water, or they may be added separately, or they may be dissolved separately and the solutions admixed. In reactions involving the preferred starting materials, such as the aluminum alcoholates and aluminum hydroxide, the bicarbonate is preferably dissolved in water first, and the aluminum compound added to the resulting solution of the bicarbonate. In reactions which are not extremely fast or which require additional heat and/or agitation to proceed at a reasonable rate, there may not be too much advantage in having one or both of the reactants in solution before being brought into contact, since one of the main advantages of putting the bicarbonate into solution first is that this procedure tends to avoid precipitation of the bicarbonate by occlusion or adsorption along with the insoluble reaction product. In a preferred procedure, the bicarbonate is dissolved in water and the aluminum alcoholate, in a substantially pure form, is stirred thereinto. A gelatinous precipitate forms very rapidly, but with time or continued stirring, is converted into a more granular and, therefore, a more easily filtered precipitate, which may be readily separated from the aqueous remainder of the reaction system.

The following examples show specific embodiments:

EXAMPLE I

Sodium bicarbonate (168 gms., 2 moles) was dissolved in 1400 cc. of water in a 2 liter stainless steel beaker. The solution temperature was adjusted to between 45 and 50° C. Liquid aluminum isopropylate (ca. 408 gms., 2 moles) was added rapidly to the sodium bicarbonate solution in the beaker, with violent agitation. The usual addition time was about 1½ minutes. A stainless steel turbine type agitator was used and run at high speed. The slurry was stirred for ten minutes and allowed to stand over night. It was then filtered and the filter cake dried to a moisture content of between 10 and 12%.

The following analytical results show a comparison between the percentages calculated for the various components of dihydroxy aluminum sodium carbonate of the formula above given, and the percentages actually found by analysis:

*Analytical results on dihydroxy aluminum sodium carbonate of Example I*

|  | Calculated | Found |
|---|---|---|
| $Al_2O_3$ | 35.40 | 36.8 |
| $CO_2$ | 30.56 | 29.59 |
| $H_2$ | 1.40 | 1.48 |
| Residue on ignition | 59.69 | 58.27 |
| Na | 15.97 | 16.2 |
| Molecular weight | 144.00 | |

Moisture _____ percent____ 11.0
pH water suspension_____ 9.70
Acid consuming power_____ cc./gm__ 230
Density _____ gms./cc__ 2.144

The moisture determination was made by heating dihydroxide aluminum sodium carbonate at 110° C. in vacuo over phosphorus pentoxide for two hours and determining the loss in weight.

The pH of the water suspension of the compound was taken as the pH of a slurry of 1 gram of the finely powdered material in 25 ml. of distilled water.

The acid consuming power of the compound was determined by adding 0.25 gm. of the finely powdered material to 75 ml. of 0.1–N hydrochloric acid. The solution was gently agitated for ten minutes and then back titrated with 0.1–N sodium hydroxide to a pH of 3.8. The acid consuming power is expressed as the ml. of 0.100–N hydrochloric acid consumed by a gram of the sample.

In order to determine its neutralization characteristics, 30 mgs. of the compound of Example I were added to 20 ml. 0.01–N hydrochloric acid and the pH change recorded with time. In this determination, the Fisher titrimeter was used with calomel and glass electrodes for pH determinations. The eye control was set using a buffer solution of pH 3 made by mixing 0.1 molar citric acid solution with 0.2 molar disodium phosphate solution in the proportion of 15.89 ml. to 4.11 ml. according to McIlvaines' standard buffer solution directions. The pH readings at 23° C. were as follows:

| Time in minutes | 1[1] | 2[1] |
|---|---|---|
| 0 | 1.61 | 1.40 |
| 2 | 2.32 | 2.00 |
| 4 | 3.10 | 2.95 |
| 5 | 3.30 | 3.12 |
| 8 | | 3.30 |
| 10 | 3.30 | 3.29 |
| 15 | 3.30 | 3.31 |
| 20 | 3.30 | 3.33 |
| 25 | 3.30 | 3.32 |
| 30 | 3.30 | 3.31 |

[1] Specimens 1 and 2 were specimens of dihydroxy aluminum sodium carbonate prepared in accordance with the method of Example I.

It will be seen from the foregoing that under the conditions of the neutralization determination above set forth, the pH value rises to a pH of at least 3 within five minutes of the beginning of the test period and shortly thereafter reaches and stays at a pH of about 3.30 for the balance of the thirty minute test period.

Dihydroxy aluminum sodium carbonate, prepared as above described, is substantially amorphous, or at least is a very poorly crystallized substance. When tested for index of refraction using the immersion method, the compound is found to have only one aggregate index of refraction, which was somewhere between 1.488 and 1.509. The reason for this broad index of refraction range is that the index of the same specimen varies when tested at different times.

The specific acid titration curve for dihydroxy aluminum sodium carbonate is illustrated in the drawing by the solid line curve indicated by the reference numeral 10. The procedure for the specific acid titration is as follows:

The reagent used is hydrochloric acid which has been adjusted as nearly as possible to a normality of 0.10 and accurately standardized. In the preparation of the sample, the antacid material to be tested is dried to 10–12% water content, the material ground to pass 100 mesh screen and then reduced to a fine powder with a mortar and pestle. A sample weight in grams of exactly 10 times the normality of the standardized hydrochloric acid is used. For example, with 0.1015 N acid, a sample weight of 1.0150 grams would be used. This is done so that the result will represent ml. of 0.1000 N acid/gram without any calculation.

In the test, the accurately weighted sample is placed in a 200 ml. high form beaker and 25.0 ml. of distilled water are added. The pH at zero acid concentration is determined with the Beckman type "E" glass electrode standardized at pH 9.18 and 10.0. Appropriate quantities of standard acid solution are added to separate samples so that the range from zero concentration of acid to 70 ml. acid/gram is covered with enough points to draw a smooth curve connecting the points. This range is the significant one for showing differences between the action of aluminum antacids. If it is desired to investigate the complete acid consuming power of the antacid, the range should be extended to 300 ml. of acid/gram. The mixture is stirred vigorously for one hour with a mechanical stirrer to give opportunity to reach equilibrium. The pH is determined in this acid range with the standard glass electrode standardized at pH 4.0 and 6.85.

The results of the test for specific acid titration characteristics of dihydroxy aluminum sodium carbonate are illustrated in the graph of the pH versus ml. of 0.100 N hydrochloric acid/gram of sample. Curve 10 is the result of the points so plotted.

The corresponding potassium and ammonium compounds can be formed by the same procedure set forth in Example I, using equi-molar proportions. In general, the potassium and ammonium compounds so produced have properties comparable to those of dihydroxy aluminum sodium carbonate, but the potassium and ammonium compounds are not so suited for use as antacid material, the potassium compound because potassium pharmaceuticals are not generally favored by the medical profession, and the ammonium compound because insufficiently stable over long storage periods.

EXAMPLE II

Reheis "F-1000" dried aluminum hydroxide gel (0.2 mole, 20.4 gms.) was thoroughly mixed with sodium bicarbonate (0.2 mole, 16.8 gms.) and 100 cc. of 65° C. water. The mixture was heated 2 hours in the water bath at 60-70° C. It was then air dried over the weekend. The cake was dried to a moisture content of between 10 and 15% by weight.

EXAMPLE III

Reheis aluminum hydroxide, compressed gel, "F-500", (0.2 mole, 102 gms.) was mixed with sodium bicarbonate (0.2 mole, 16.8 gms.) and heated at 60-70° C. for 6 hours. The dihydroxy aluminum sodium carbonate formed as a precipitate was allowed to stand over night and was then filtered. It was air dried to a moisture content of between 10 and 15% by weight.

The corresponding potassium and ammonium carbonates can be substituted for the sodium carbonate of Examples II and III, using equi-molar proportions, and the reaction will proceed with the formation of the corresponding dihydroxy aluminum potassium carbonate or dihydroxy aluminum ammonium carbonate.

Theoretically, the dihydroxy aluminum sodium carbonate and the corresponding potassium and ammonium carbonates should be water soluble. However, they are practically insoluble in water, being soluble to the extent of only a few thousandths of a percent. This obviously means that the compounds exist as insoluble complexes. Washings and prolonged treatment with water will, of course, alter the surface of the complexes and eventually result in their break down to form aluminum hydroxide. As formed by the reactions given above and without prolonged treatment with water, these complexes can be isolated and dried to recover them as compounds of the formulae above given.

The extremely low solubility of the complexes, however, indicates that they may be polymers, such as represented by the formula:

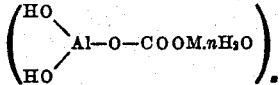

wherein $n$ is zero or a small integer, and $x$ is an unknown integer. No method is known for determining the value of $x$.

In order to determine the ability of dihydroxy aluminum sodium carbonate to form lakes, or dye complexes, successive samples of equal weight of that compound were mixed with similar volumes of various dye solutions, the mixtures allowed to stand 10 minutes and then filtered and the filter cakes washed with equal volumes of water until the filtrate was free of non-adsorbed dye. Of the dyes employed, eosin, erythrosine and logwood extract all showed strong adsorption by the dihydroxy aluminum sodium carbonate.

This is a continuation in-part of my applications Serial Nos. 342,957 (now forfeited) and 400,822.

I claim as my invention:

1. A method of preparing a compound having in its anhydrous form the formula

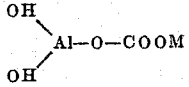

wherein M is an monovalent radical selected from the group consisting of alkali metal and ammonium radicals, which comprises bringing together in an aqueous medium a cationic aluminum compound selected from the group consisting of aluminum alcoholates in which the alkoxide group is a $C_2$ to $C_4$ group and aluminum hydroxide and at least an equimolar weight of a bicarbonate of the formula $MHCO_3$ to effect the precipitation of said compound having the foregoing formula, and recovering said compound.

2. The method of claim 1, wherein the cationic aluminum compound is an aluminum alkoxide having $C_2$ to $C_4$ in the alkoxide group.

3. The method of claim 1, wherein the cationic aluminum compound is aluminum isopropylate.

4. The method of claim 1, wherein the cationic aluminum compound is aluminum hydroxide.

5. The method of claim 1, wherein the cationic aluminum compound is an aluminum hydroxide gel.

6. The method of preparing dihydroxy aluminum sodium carbonate, which comprises bringing together an aluminum alkoxide in which the alkoxide group is a $C_2$-$C_4$ group and at least an equi-molar weight of sodium bicarbonate in aqueous solution to obtain a precipitate and recovering said precipitate.

7. The method of preparing dihydroxy aluminum sodium carbonate, which comprises bringing together aluminum isopropylate and at least an equi-molar weight of sodium bicarbonate in aqueous solution to obtain a precipitate and recovering said precipitate.

8. The method of preparing dihydroxy aluminum potassium carbonate, which comprises bringing together an aluminum alkoxide in which the alkoxide group is a $C_2$-$C_4$ group and at least an equimolar weight of potassium bicarbonate in aqueous solution to obtain a precipitate and recovering said precipitate.

9. The method of preparing dihydroxy aluminum ammonium carbonate, which comprises bringing together an aluminum alkoxide in which the alkoxide group is a $C_2$-$C_4$ group and at least an equimolar weight of ammonium bicarbonate in aqueous solution to obtain a precipitate and recovering said precipitate.

10. The method of preparing dihydroxy aluminum potassium carbonate, which comprises bringing together aluminum isopropylate and at least an equi-molar weight of potassium bicarbonate in aqueous solution to obtain a precipitate and recovering said precipitate.

11. The method of preparing dihydroxy aluminum ammonium carbonate, which comprises bringing together aluminum isopropylate and at least an equi-molar weight of ammonium bicarbonate in aqueous solution to obtain a precipitate and recovering said precipitate.

No references cited.